United States Patent

Steeby

[11] Patent Number: 5,409,432
[45] Date of Patent: Apr. 25, 1995

[54] CONTROL SYSTEM/METHOD FOR ENGINE BRAKE ASSISTED SHIFTING

[75] Inventor: Jon A. Steeby, Schoolcraft, Mich.

[73] Assignee: Eaton Corporation, Cleveland, Ohio

[21] Appl. No.: 103,947

[22] Filed: Aug. 10, 1993

[51] Int. Cl.⁶ .................................................. B60K 41/28
[52] U.S. Cl. ........................................ 477/71; 477/78; 477/91; 477/120; 477/902; 364/424.1
[58] Field of Search .................. 477/71, 73, 77, 78, 477/91, 110, 120, 121, 902; 364/424.1

[56] References Cited

U.S. PATENT DOCUMENTS

| | | | |
|---|---|---|---|
| 4,361,060 | 11/1982 | Smyth | 74/866 |
| 4,595,986 | 6/1986 | Daubenspeck et al. | 364/424.1 |
| 4,648,290 | 3/1987 | Dunkley et al. | 74/866 |
| 4,722,248 | 2/1988 | Braun | 74/866 |
| 4,768,636 | 9/1988 | Ito et al. | 477/71 |
| 4,905,544 | 3/1990 | Ganoung | 477/109 |
| 4,933,850 | 6/1990 | Wheeler | 364/424.1 |
| 4,945,484 | 7/1990 | Cote et al. | 364/424.1 |
| 5,042,327 | 8/1991 | Stainton | 74/866 |
| 5,050,427 | 9/1991 | Cote et al. | 73/118.1 |
| 5,125,294 | 6/1992 | Takashi et al. | 364/424.1 X |
| 5,235,877 | 8/1993 | Takahashi et al. | 477/123 |
| 5,285,880 | 2/1994 | Minagawa et al. | 192/3.58 |

Primary Examiner—Andrea L. Pitts
Attorney, Agent, or Firm—Howard D. Gordon

[57] ABSTRACT

A control method/system for controlling upshifting in an automated mechanical transmission system (10) provided with an engine compression brake (50) is provided. A control unit (54) is effective to operate the engine compression brake during a transmission upshift such that at initiation of an upshift the engine compression brake applies a minimum retarding torque to the engine, the retarding torque is then gradually increased to a maximum retarding torque value and, upon sensing that engine speed (ES) is within a predetermined value (REF$_1$) of the synchronous value thereof, the retarding torque applied by the engine brake is caused to gradually decrease until such time as engine speed reaches the synchronous window therefor.

12 Claims, 3 Drawing Sheets

CONTROL SYSTEM/METHOD FOR ENGINE BRAKE ASSISTED SHIFTING

BACKGROUND OF THE INVENTION

1. Field of the Invention

The present invention relates to a control system/-method for controlling the shifting of vehicular fully or partially automated mechanical transmission systems of the type including an engine equipped with an engine brake and, in particular, relates to a control system/-method of the above-described type which is effective to automatically apply the engine brake in a modulated manner to achieve rapid and smooth upshifting.

2. Description of the Prior Art

Vehicular fully and partially automated mechanical transmission systems are known in the prior art as may be seen by reference to U.S. Pat. Nos. 4,361,060; 4,595,986; 4,648,290; 4722,248 and 5,050,427, the disclosures of all of which are hereby incorporated by reference.

Such fully or partially automated mechanical transmission systems typically include a microprocessor based controller for issuing command output signals to various controllers to implement selected transmission shifts, including manipulation of the engine fueling and-/or of engine or input shaft brakes to cause the transmission input shaft to rotate at a substantially synchronous speed for a given output shaft speed and target gear ratio.

Engine brakes, usually called "engine compression brakes" or "exhaust brakes" are well known in the prior art and such devices, such as the well known "Jake Brake", are commonly provided on heavy duty vehicles. These devices are typically manually operated, may provide variable retardation by manual selection of one, two or three banks of cylinders operation, and are utilized to retard the vehicle and, in recent developments, to quickly retard engine/input shaft speed for more rapid synchronization during an upshift. Examples of vehicular automated mechanical transmission systems utilizing engine compression brakes may be seen by reference to U.S. Pat. Nos. 4,933,850 and 5,042,327, the disclosure of which are incorporated herein by reference.

Generally, engine compression brakes are selective to alter, usually hydraulically, the engine valve timing-/porting so that a relatively large compressive force and resistance is provided to rotation of the engine from rotational inertia and, as caused by the vehicle drive wheels, acting through to drive axles, drive shaft, transmission and master clutch.

The prior art automated mechanical transmission systems of the type having manually operated engine brakes were not totally satisfactory as engine brake assisted upshifts tended to be somewhat harsh and abrupt and/or were not as rapid as desired.

SUMMARY OF THE INVENTION

In accordance with the present invention, the drawbacks of the prior art are overcome by the provision of a control system/method for an engine brake equipped automated mechanical transmission system which is effective to provide smooth, high quality and rapid upshifts. The above is accomplished by allowing automatic actuation of the engine brake, during an upshift, which will override the operator's manual operation thereof.

The engine brake is operated by the system controller during an upshift to exert a minimum retarding torque at initiation of the shift and to then exert a smoothly increasing retarding torque, until a maximum retarding torque value is achieved, and to exert a smoothly decreasing retarding torque upon sensing that engine rotational speed (ES) and input shaft rotational speed (IS) are within a predetermined value (about 80 to 100 RPM) of synchronous speed, which is equal to the product of output shaft speed times the numerical value of the target gear ratio ($OS*GR_T$). Upon engine speed-/input shaft speed reaching the "synchronous window", usually about plus or minus 40 RPM of exact synchronous, i.e. when $ES=IS=(OS*GR_T)\pm 40$ RPM, the engine brake is turned off and the jaw clutch members associated with the target ratio are caused to be engaged. Of course, the controller will preferably initiate these events in advance in view of actuator response times, current values of engine speed and output shaft shaft, and/or the rates of change thereof.

Accordingly, it is an object of the present invention to provide a new and improved control for an automated mechanical transmission system equipped with an engine brake which will automatically control the engine brake during upshifts to provide smooth, high quality and rapid upshifts. This and other objects and advantages of the present invention will become apparent from a reading of the detailed description of the preferred embodiment taken in connection with the attached drawings.

DESCRIPTION OF THE PREFERRED EMBODIMENT

Figure 1:
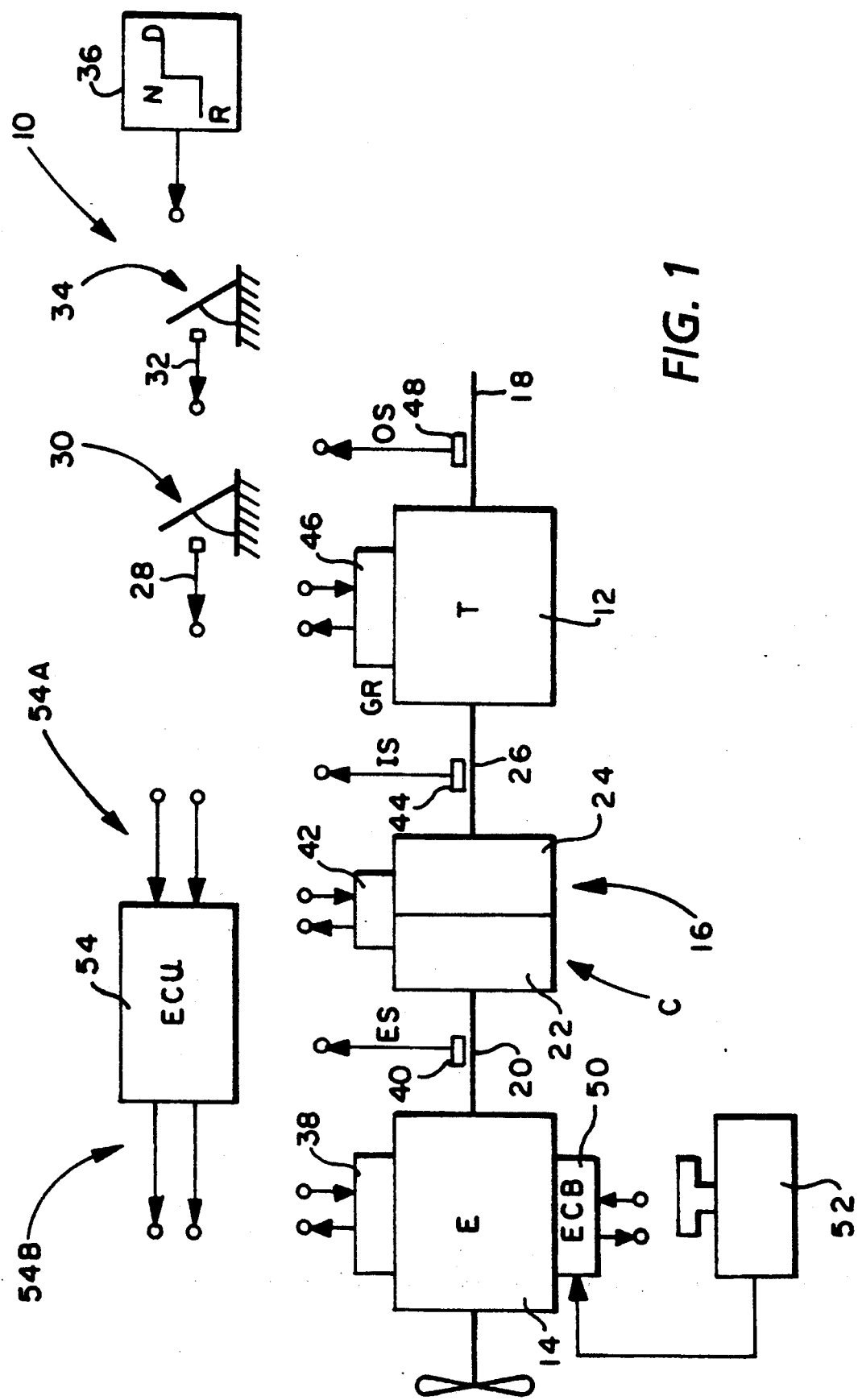
FIG. 1 is a schematic illustration of an automated mechanical transmission system of the type particularly well suited to be controlled by the method/apparatus of the present invention.

FIG. 1 schematically illustrates a vehicular automated mechanical transmission system 10 including an automated multiple speed change gear transmission 12 driven by a fuel control engine 14, such as a well known diesel engine, through a non-positive coupling such as a master friction clutch 16. The output of the automated transmission 12 is output shaft 18 which is adapted for driving connection to an appropriate vehicle component such as the differential of a drive axle, a transfer case, or the like, as is well known in the prior art.

The crankshaft 20 of engine 14 will drive the driving plates 22 of the master friction clutch 16 which are frictionally engageable to driven plates 24 for driving the input shaft 26 of transmission 12.

The above-mentioned power train components are acted upon, monitored by and/or controlled by several devices, each of which will be discussed briefly below.

These devices include a throttle pedal position or throttle opening monitor assembly 28 which senses the operator set position of operator control throttle device 30, a brake applied monitor assembly 32 which senses operator operation of a brake pedal 34 and a shift control monitor assembly 36 by which the operator may select a reverse (R), neutral (N) or forward drive (D) mode of operation of the vehicle. The devices may also include a fuel controlled device 38 for controlling the amount of fuel to be supplied to engine 14, and engine speed sensor 40 which senses the rotational speed of the engine, a clutch operator 42 which engages and disengages master clutch 16 and which may also provide information as to the status of the clutch, and input shaft speed sensor 44 for sensing the rotational speed of transmission input shaft 26, a transmission operator 46 which is effective to shift the transmission 12 into a selected gear ratio and to provide a signal indicative of a gear neutral position and/or the currently engaged gear ratio of the transmission, and an output shaft speed sensor 48 for sensing the rotational speed of the output shaft 18. An engine brake 50 is provided for selectively retarding the rotational speed of engine 14 and a manually operated engine brake operator 52 is provided, usually in the vehicle cab, allowing the operator to selectively apply the engine brake. Preferably, engine 14 is electronically controlled and is equipped to provide information on and to accept command signals from a data base conforming with a known protocol such as SAE J1939.

Drive components and controls therefor of the type described above are known in the prior art and may be appreciated in greater detail by reference to U.S. Pat. Nos. 4,959,986; 4,576,065 and 4,445,393, the disclosures of which are hereby incorporated by reference. The sensors may be of any known type of construction for generating analog and/or digital signal proportional to the parameter monitored thereby. Similarly, the operators may be of any known electric, hydraulic, pneumatic or combination type for executing operations in response to command output signals.

The above-mentioned devices supply information to and/or accept command outputs from a central processing unit or control 54. The central processing unit 54 may include analog and/or digital electronic calculation and logic circuitry as is well known in the prior art. An electrical power source (not shown) and/or a source of pressurized fluid (not shown) provides an electrical and/or fluid power to the various sensing and/or operating and/or processing units.

In addition to direct inputs, the central processing unit 54 may be provided with circuits for differentiating input signals from the various sensors to provide a calculated signal indicative of the rates of change thereof.

As is known, and as disclosed in above-mentioned U.S. Pat. No. 4,595,986, central processing unit 54 is adapted to receive various input signals 54A from the sensors and to process same according to predetermined logic rules to issue command output signals 54B to the appropriate system actuators.

In automated, mechanical transmission systems of the type illustrated in FIG. 1, synchronization of the jaw clutch members associated with engagement of a target gear ratio is normally accomplished by selectively increasing or decreasing engine speed, with a master clutch engaged, to cause the input shaft to rotate at a rotational speed generally equal to the product of the output shaft speed multiplied by the numerical ratio of the target gear ratio. For downshifts, where input shaft speed must generally be increased, increased fueling of the engine will provide the desired increase in engine speed while for upshifts, where input shaft speed must normally be decreased, reduced fueling of the engine will allow the engine speed to decay down to an acceptable value. However, where more rapid upshifting is required, the deceleration rate of the engine may be increased by the use of braking devices such as the engine compression brake 50 described above and/or an input shaft brake which is normally manually operated by a ride through detent switch associated with a master clutch control and thus is normally only seen with transmissions having a manual clutch pedal. Engine compression brakes have the added benefit of being manually operable to function as a retarder to supplement the vehicle brake system for operation such as descending a long grade which might seriously overheat the vehicle service brakes.

Engine brake 50, also known as an "engine compression brake" or an "exhaust brake" such as a well known "Jake Brake", are well known in the heavy duty track industry. Briefly, such devices are usually manually actuated by an operator control such as switch 52, and are effective to apply a retarding torque to rotation of an engine, usually by hydraulically modifying the configuration of the engine exhaust valving. The exhaust brakes are typically used to provide two functions, first they are utilized to supplement the vehicle brake system to retard the vehicle under certain conditions such as traveling downhill and second they are also utilized during an upshift of a transmission to more rapidly achieve synchronous by retarding the rotational speed of the input shaft more rapidly than would occur under the normal deceleration of the input shaft and/or engine in the absence of exhaust braking. While the manual use of engine compression brakes with both manual and automated mechanical transmissions does provide more rapid upshifting, it has not been totally satisfactory as such engine brake assisted upshifts tend to be somewhat harsh and abrupt.

Figure 2:
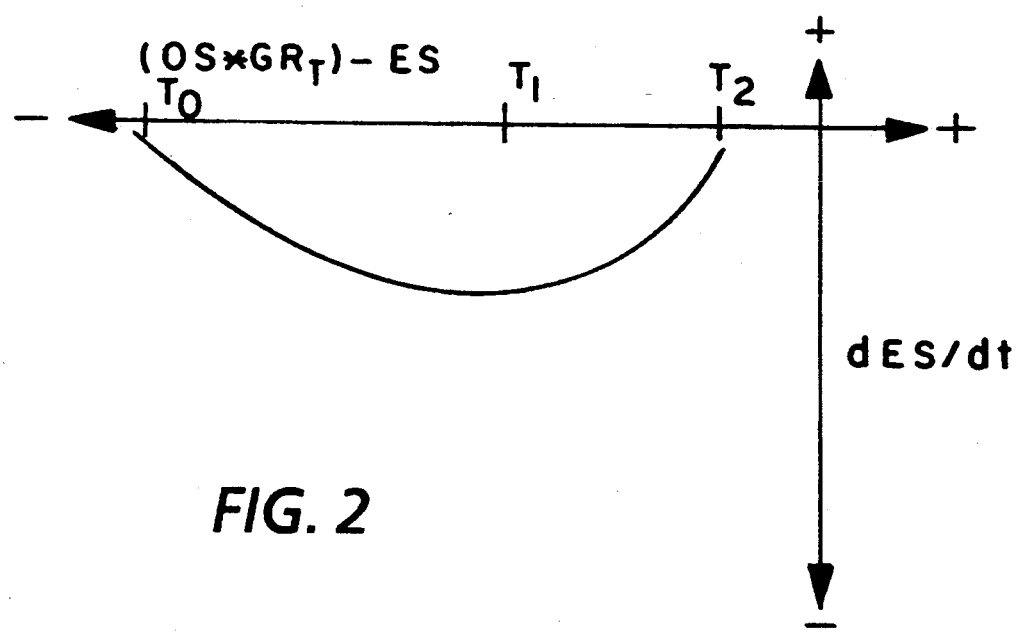
FIG. 2 is a schematic illustration, ingraphical format, of the automatic operation of an engine brake during an upshift according to the control method/system of the present invention.
Figure 3:
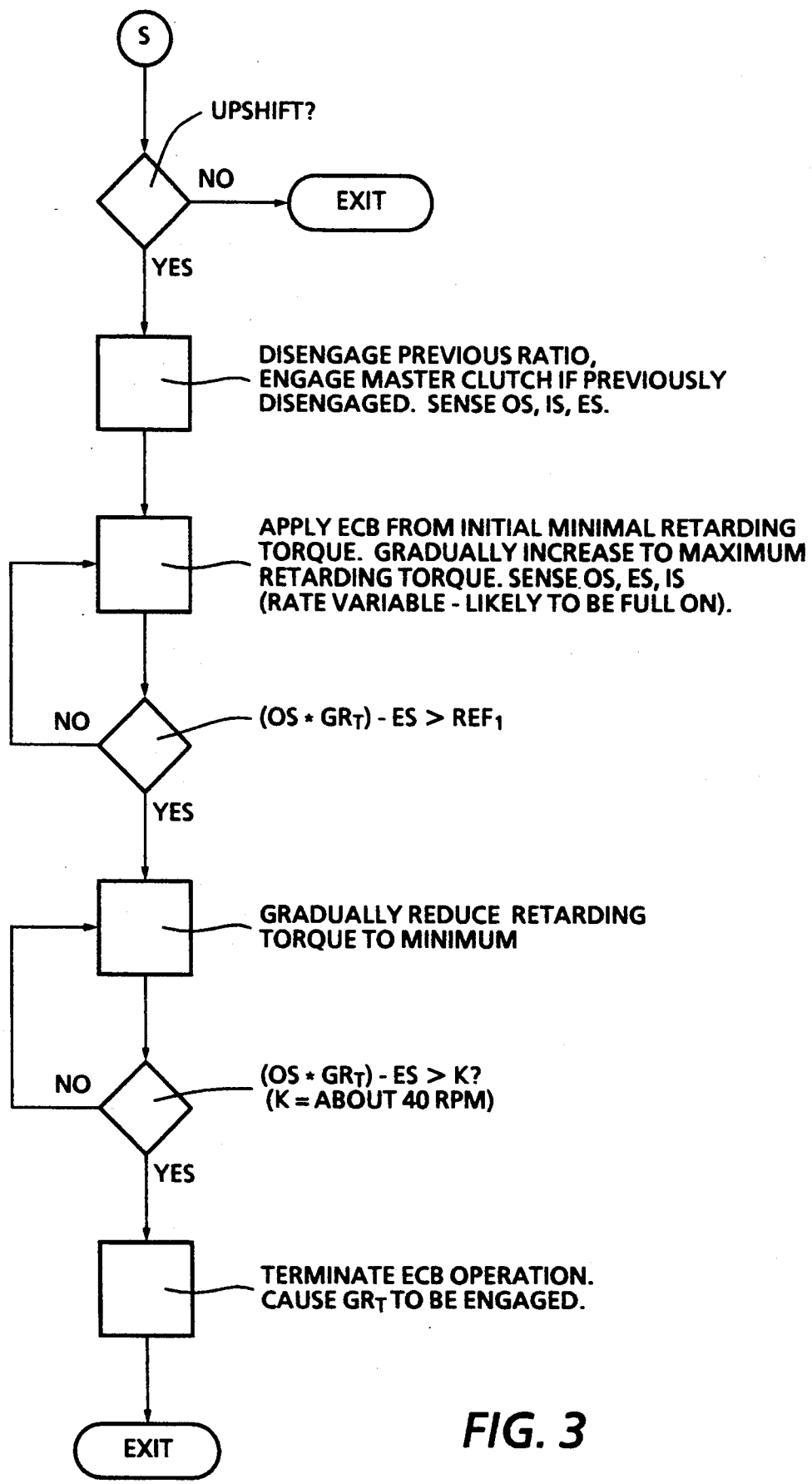
FIG. 3 is a schematic illustration, in flow chart format, of the control system/method of the present invention.

According to the present invention, as may be seen by reference to FIGS. 2 and 3, in addition to manual operation of engine brake 50, the engine brake is also operable in response to command output signals from system controller 54, which command output signals may be supplied via a data base conforming to the SAE J1939 protocol. In its preferred embodiment, the control method/system of the present invention will override manual control of the engine brake during upshifts only and will be effective to apply the engine brake in a modulated manner designed to provide rapid yet high quality smooth upshifting of the transmission 12. Referring to FIG. 2, the controller is effective to apply the engine brake in such a manner that the deceleration of engine speed, $dES/dt$, will be gradually increased from an initial value towards a maximum deceleration value at the onset, $T_0$, of an upshift. At a later time, $T_1$, when the engine speed/input shaft speed exceeds the exact synchronous speed, $OS \times GR_T$, no greater than a predetermined value, usually about 80–100 RPM, the retarding torque of the engine brake will begin to be gradually decreased to achieve a gradually decreasing engine deceleration. At a later time $T_2$ when engine speed is within the "synchronous window", $OS \times GR_T \pm$ about 40 RPM, then the engine brake will be turned off and the transmission actuator 46 commanded to cause engagement of the jaw clutch members of transmission 12 associated with the target gear ratio.

Figure 1A:
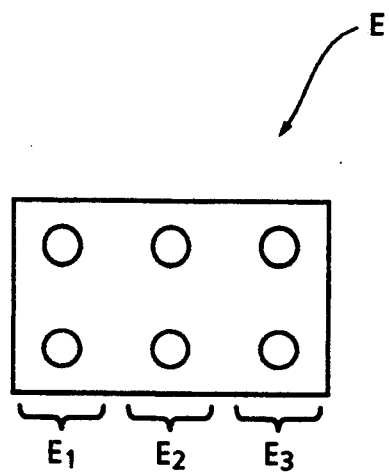
FIG. 1A is a schematic top view illustration of a typical 6-cylinder diesel engine having three banks of two cylinders each.

As presently contemplated, there are three methods for modulating the amount of retarding torque applied to the engine 14 by the engine brake 50. A first method involves bank selection wherein, for a typical six cylinder diesel engine, one, two or three banks of two cylinders apiece may be subjected to engine compression braking, depending on the magnitude of input shaft deceleration required. FIG. 1A schematically illustrates a typical 6-cylinder diesel engine having three banks, $E_1$, $E_2$ and $E_3$, of two cylinders each. Another method involves a hydraulic pulse technique analogous to electronic pulse width modulation wherein the application of hydraulic pressure to modify the engine exhaust valving configuration is controllably pulsed on and off to selectively modulate the average retardation torque applied to the engine. This method is somewhat coarse as the system hydraulic logic base frequency will be in the one to two hertz range. In a further method, variable hydraulic control to provide a continuously variable engine exhaust valving configuration for continuously variable retarding torque may also be utilized. Of course, combinations of the above methods and/or alternative methods for varying the retarding torque applies to the engine by the engine brake mechanism may be utilized in the control system/method of the present invention.

Although the present invention has been described with a certain degree of particularity, it is understood that various modifications are possible without departing from the spirit and the scope of the invention as hereinafter claimed.

I claim:

1. A control method for controlling upshifting in a vehicular automated mechanical transmission system (10) comprising a throttle controlled engine (14) a mechanical change gear transmission (12) having a plurality of gear ratio combinations selectively engageable between a transmission input shaft (26) and a transmission output shaft (18), each of said gear ratio combinations defining a numerical ratio of input shaft rotational speed to output shaft rotational speed, a selectively engageable and disengageable master friction clutch (16) drivingly interposed between said engine and said transmission, an information processing unit (54) having means for receiving a plurality of input signals including an input signal (ES) indicative of the rotational speed of said engine and an input speed (OS) indicative of the rotational speed of said output shaft and means for processing said input signals in accordance with predetermined logic rules for generating command output signals (54B) whereby said transmission system is operated in accordance with said logic rules, an engine brake (50) selectively actuatable provide a selectively variable retarding torque having a maximum retarding torque value to the rotation of said engine, and actuators responsive to said command output signals including a fueling actuator (38) for controlling the amount of fuel supplied to said engine, a clutch actuator (42) for selectively engaging and disengaging said coupling a transmission operator (46) for selectively engaging and disengaging selected gear ratios in said transmission and an engine brake actuator for selectively applying said engine brake, and a manual actuator (52) for manually applying said engine brake, said control method characterized by the steps of:

at initiation of an upshift from a currently engaged gear ratio ($GR_C$) to a target gear ratio ($GR_T$), causing said currently engaged gear ratio to be disengaged and causing said master friction clutch to be engaged;

automatically causing said engine brake to be applied with an initial minimum retarding torque and then causing said engine brake to be applied with an increasing retarding torque until said maximum retarding torque value is reached;

upon sensing that engine speed exceeds the product of output shaft speed and the numerical ratio of said target gear ratio by less than a first reference value ($ES<(OS*GR_T)+REF_1$), causing said engine brake to be applied with a decreasing retarding torque, and upon sensing that engine speed exceeds said product of output shaft speed and the numerical ratio of said target gear ratio by less than a second reference value ($ES<(OS*GR_T)+REF_2$), said second reference value less than said first reference value ($REF_2<REF_1$), causing said engine brake to cease to be applied and causing said transmission actuator to engage said target gear ratio.

2. The method of claim 1 wherein said engine is a diesel engine having an operating range of about 600 RPM to 2200 RPM, said first reference value equals about 100 RPM and said second reference value equals about 40 RPM.

3. The method of claim 1 wherein said engine brake is an engine compression brake.

4. The method of claim 3 wherein said engine compression brake is a hydraulically actuated engine compression brake and the retarding torque applied by said engine compression brake is proportional to a magnitude of hydraulic pressure applied thereto.

5. The method of claim 3 wherein said control unit is effective to control the retarding torque applied to said engine by said engine compression brake by selectively pulsing hydraulic pressure applied to said engine compression brake actuator.

6. The control method of claim 1 wherein said diesel engine comprises a plurality of banks of cylinders and said engine brake is an engine compression brake having a first mode of operation wherein said engine brake is effective to operate on a selected single bank of said cylinders and a second mode of operation wherein said engine brake is effective to operate on a selected at least two banks of said cylinders.

7. A control system for controlling upshifting in a vehicular automated mechanical transmission system (10) comprising a throttle controlled engine (14) a mechanical change gear transmission (12) having a plurality of gear ratio combinations selectively engageable between a transmission input shaft (26) and a transmission output shaft (18), each of said gear ratio combinations defining a numerical ratio of input shaft rotational speed (IS) to output shaft rotational speed (OS), a selectively engageable and disengageable master friction clutch (16) drivingly interposed between said engine and said transmission, an information processing unit (54) having means for receiving a plurality of input signals including an input signal (ES) indicative of the rotational speed of said engine and an input speed (OS) indicative of the rotational speed of said output shaft and means for processing said input signals in accordance with predetermined logic rules for generating command output signals (54B) whereby said transmission system is operated in accordance with said logic rules, an engine brake (50) selectively actuatable provide a selectively variable retarding torque having a maximum retarding torque value to the rotation of said engine, and actuators responsive to said command output signals including a fueling actuator (38) for controlling the amount of fuel supplied to said engine, a clutch actuator (42) for selectively engaging and disengaging said coupling a transmission operator (46) for selectively engaging and disengaging selected gear ratios in said transmission and an engine brake actuator for selectively applying said engine brake, and a manual actuator (52) for manually applying said engine brake, said control system characterized by:

means effective at initiation of an upshift from a currently engaged gear ratio ($GR_C$) to a target gear ratio ($GR_T$), for causing said currently engaged gear ratio to be disengaged and causing said master friction clutch to be engaged;

means for automatically causing said engine brake to be applied with an initial minimum retarding torque and then causing said engine brake to be applied with an increasing retarding torque until said maximum retarding torque value is reached;

means effective upon sensing that engine speed exceeds the product of output shaft speed and the numerical ratio of said target gear ratio by less than a first reference value ($ES<(OS*GR_T)+REF_1$), for causing said engine brake to be applied with a decreasing retarding torque, and means effective upon sensing that engine speed exceeds said product of output shaft speed and the numerical ratio of said target gear ratio by less than a second reference value ($ES<(OS*GR_T)+REF_2$), said second reference value less than said first reference value ($REF_2<REF_1$), for causing said engine brake to cease to be applied and causing said transmission actuator to engage said target gear ratio.

8. The system of claim 7 wherein said engine is a diesel engine having an operating range of about 600 RPM to 2200 RPM, said first reference value equals about 100 RPM and said second reference value equals about 40 RPM.

9. The system of claim 7 wherein said engine brake is an engine compression brake.

10. The system of claim 9 wherein said engine compression brake is a hydraulically actuated engine compression brake and the retarding torque applied by said engine compression brake is proportional to a magnitude of hydraulic pressure applied thereto.

11. The system of claim 9 wherein said control unit is effective to control the retarding torque applied to said engine by said engine compression brake by selectively pulsing hydraulic pressure applied to said engine compression brake actuator.

12. The control system of claim 7 wherein said diesel engine comprises a plurality of banks of cylinders and said engine brake is an engine compression brake effective to operate on a selected one or more banks of said cylinders.

* * * * *